United States Patent
Shen

(10) Patent No.: US 6,185,152 B1
(45) Date of Patent: Feb. 6, 2001

(54) SPATIAL SOUND STEERING SYSTEM

(75) Inventor: Albert Shen, Portland, OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/221,664

(22) Filed: Dec. 23, 1998

(51) Int. Cl.[7] .................................................. G01S 3/80
(52) U.S. Cl. ............................................................ 367/118
(58) Field of Search ................................... 367/127, 118, 367/151, 96, 87

(56) References Cited

U.S. PATENT DOCUMENTS

| | | | |
|---|---|---|---|
| D. 381,024 | 7/1997 | Hinzmann et al. | D14/225 |
| D. 389,839 | 1/1998 | Woodman et al. | D14/227 |
| 4,239,356 | * 12/1980 | Freudenschuss et al. | 367/96 |
| 4,312,053 | * 1/1982 | Lipsky | 367/127 |
| 4,400,724 | 8/1983 | Fields | 358/85 |
| 4,639,904 | * 1/1987 | Riedlinger | 367/151 |
| 5,099,456 | * 3/1992 | Wells | 367/127 |
| 5,625,410 | 4/1997 | Washino et al. | 348/154 |
| 5,664,021 | 9/1997 | Chu et al. | 381/92 |
| 5,686,957 | 11/1997 | Baker | 348/36 |
| 5,715,319 | 2/1998 | Chu | 381/26 |
| 5,742,693 | 4/1998 | Elko | 381/92 |
| 5,778,082 | 7/1998 | Chu et al. | 381/92 |
| 5,787,183 | 7/1998 | Chu et al. | 381/92 |

OTHER PUBLICATIONS

"Concorde 4500 Including System 4000ZX Group Videoconferencing System", Copyright 1997 PictureTel Corporation, hosted by Onward Technologies, Inc., 2 pages.

"Developer's ToolKit For Live 50/100 and Groups Systems", Copyright 1997 PictureTel Corporation, hosted by Onward Technologies, Inc., 2 pages.

"LimeLight Dynamic Speaker Locating Technology", Copyright 1997 PictureTel Corporation, hosted by Onward Technologies, Inc., 3 pages.

"Product Specifications, Concorde 4500 Including System 4000ZX Group Videoconferencing system", Copyright 1997 PictureTel Corporation, hosted by Onward Technologies, Inc.,5 pages.

"Virtuoso Advnaced Audio Package", Copyright 1997 PictureTel Corporation, hosted by Onward Technologies, Inc., 1 page.

Begault, D.R., *3–D Sound for Virtual Reality and Multimedia,* Academic Press, Inc., Chestnut Hill, MA, table of contents, (1994).

Crossman, A., "Summary of ITU–T Speech/Audio Codes Used in the ITU–T Videoconferencing Standards", PictureTel Corporation, 1 page, (Jul. 1, 1997).

* cited by examiner

*Primary Examiner*—Daniel T. Pihulic
(74) *Attorney, Agent, or Firm*—Schwegman, Lundberg, Woessner & Kluth, P.A.

(57) ABSTRACT

An apparatus and method for determining directionality of acoustic signals arriving from an acoustic source is disclosed. A plurality of reflectors for modifying the acoustic signals and a transducer located proximate to the reflectors is used. A notch detector detects and identifies spectral notches in the modified acoustic signals. A device then determines the direction of the acoustic source. In one embodiment, a microphone system capable of detecting three-dimensional sound is provided. The microphone system comprises an elliptical-shaped microphone enhancer having at least two reflectors located different distances apart from a microphone located in the center of the ellipse. The reflectors have asymmetric ridges which cause interference patterns in the signals received by the microphone, conceptually analogous to the patterns generated by the pinnae of the human ear.

30 Claims, 6 Drawing Sheets

SPATIAL SOUND STEERING SYSTEM

FIELD

This invention relates generally to sound steering systems and, in particular the present invention relates to a spatial sound steering system utilizing three-dimensional spatial audio technology.

BACKGROUND

Many systems have been proposed which can detect a signal from a sound source for a variety of different purposes. Videoconferencing systems and other communication systems, as well as various types of security, automation and monitoring systems are used to enhance, simplify or safeguard lives. More advanced sound-detecting systems also make it possible to determine the direction or location of the sound source using voice-directional camera image steering. In U.S. Pat. No. 5,778,082 to Chu et al., for example, a system and method for localization of an acoustic source is described using a pair of spatially separated microphones to obtain direction or location of speech or other acoustic signals from a common sound source. Similarly, U.S. Pat. No. 5,686,957 to Baker uses an array of microphones to determine the direction of a particular human speaker in a hemispheric viewing area, and to provide directional signals to a video camera system. However, since the Chu and Baker systems, as well as other similar systems can only detect the "differences" in audio signal amplitude, two or microphones must be used to determine directionality of a sound source, thus increasing the cost and complexity of these systems.

U.S. Pat. No. 5,742,693 to Elko discloses an acoustic transducer comprising a finite acoustical reflecting surface or baffle having one or more sensors to produce a first or second-order differential response pattern at a predetermined frequency. The sensors in Elko are image-derived sensors which must be positioned on the baffle itself. Furthermore, the transducer in Elko requires the baffle to be about one to one-half of an acoustic wavelength at a predetermined frequency. Such limitations make it difficult to use the device in Elko with standard videoconferencing equipment, such as video cameras.

For the reasons stated above, there is a need in the art for a more convenient and compact system for detecting the directionality of a sound source.

SUMMARY

An apparatus and method for determining directionality of acoustic signals arriving from an acoustic source is disclosed. A plurality of reflectors for modifying the acoustic signals and a transducer located proximate to the reflectors is used. A notch detector detects and identifies spectral notches in the modified acoustic signals. A device then determines the direction of the acoustic source.

In one embodiment, a microphone system capable of detecting three-dimensional sound is provided. The microphone system comprises an elliptical-shaped microphone enhancer having at least two reflectors located different distances apart from a microphone located in the center of the ellipse. The reflectors have asymmetric ridges which cause interference patterns in the signals received by the microphone, conceptually analogous to the patterns generated by the pinnae of the human ear.

In another embodiment, a sound steering system is disclosed which utilizes the directional information to guide a camera towards a sound source. Unlike conventional videoconferencing systems which use specialized imaging equipment, or require at least two microphones to determine directionality, the sound steering system of the present invention requires only one microphone and can be integrated with conventional videoconferencing equipment.

In another embodiment, an analog signal from the microphone system is converted into separate frames of time-based digital audio information. Fourier analysis is used to convert this time-based information into frequency-based spectral coefficients. A spatial estimator then uses the spectral coefficients to find spectral notches or anti-resonances within frames. The spatial estimator associates these frames with known spatial coordinates using a look-up table and conveys this information to the camera motor.

DETAILED DESCRIPTION

Figure 1:
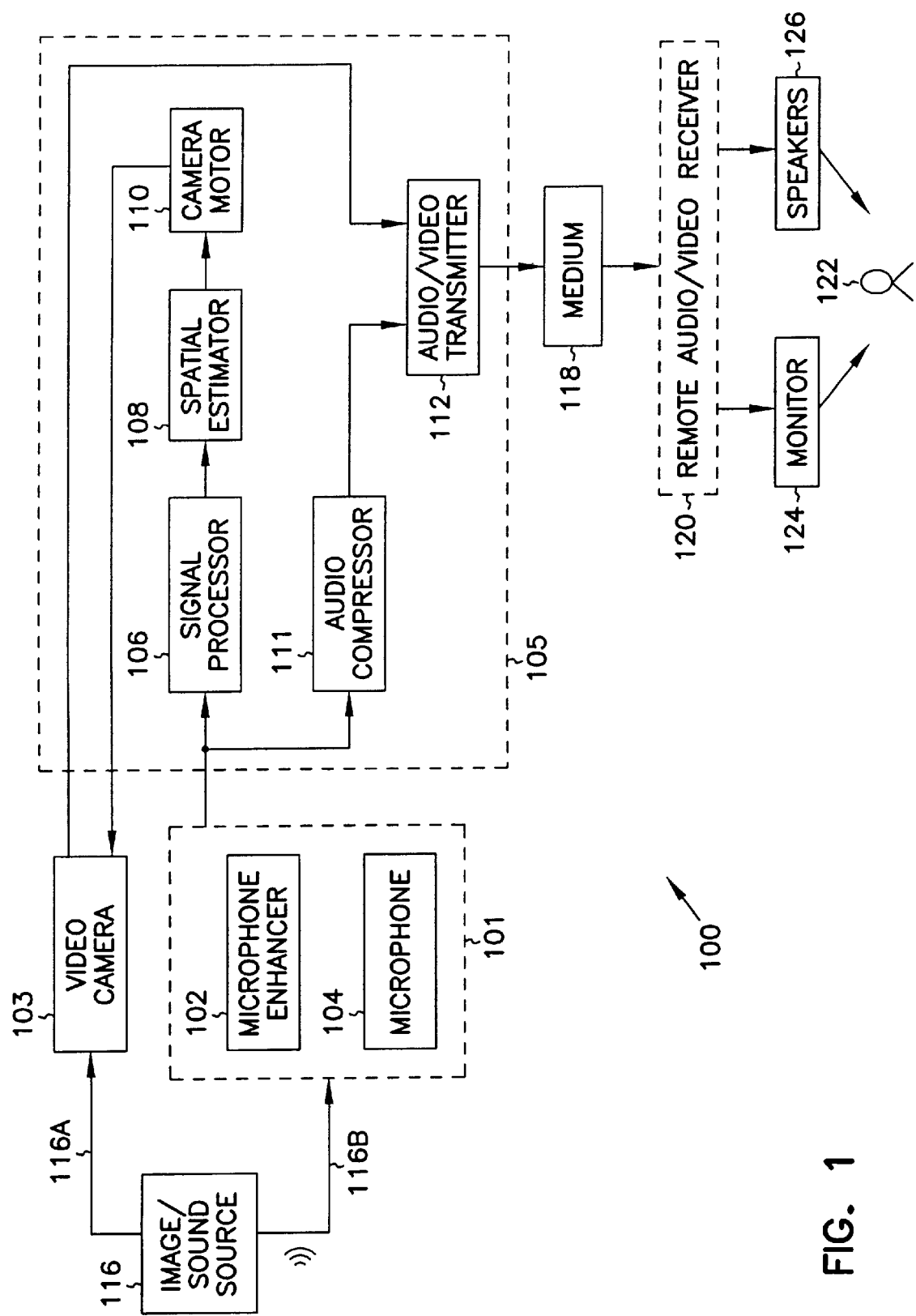
FIG. 1 is a block diagram of a sound steering system in one embodiment of the present invention.

An apparatus and method for determining directionality of acoustic signals arriving from an acoustic source is disclosed. In the following detailed description, reference is made to the accompanying drawings which form a part hereof, and in which is shown by way of illustration specific embodiments in which the inventions may be practiced. In the drawings, like numerals describe substantially similar components throughout the several views. These embodiments are described in sufficient detail to enable those skilled in the art to practice the invention, and it is to be understood that other embodiments may be utilized and that mechanical, procedural, electrical and other changes may be made without departing from the spirit and scope of the present inventions. The following detailed description is, therefore, not to be taken in a limiting sense, and the scope of the present invention is defined only by the appended claims, along with the fill scope of equivalents to which such claims are entitled.

The ability to "generate" virtual acoustics or three-dimensional (3D) sound is known in the art. This technology is used in interactive/virtual reality systems, multimedia systems, communications systems, and so forth. Essentially, by using a suitably designed digital filter, it is possible to place sounds anywhere in the "virtual" space surrounding a headphone listener. A conventional 3-D sound system, therefore, uses processes that either complement or replace spatial attributes which originally existed in association with a given sound source in order to create a spatialized sound. In contrast, the present invention provides a unique 3-D sound steering system for "detecting" existing 3D sound from a sound source.

Referring to FIG. 1, a block diagram of a computerized sound steering system (hereinafter "system") 100 according to one embodiment of the invention is shown. The system 100 comprises a microphone system 101, a video camera 103, and a controller 105. The controller 105 includes a signal processor 106, a spatial estimator 108, a camera motor 110, an audio compressor 111, and an audio/video transmitter 112. Input into the system 100 is from an image/sound source 116. Specifically, input into the video camera 103 is from the image source 116A and input into the microphone enhancer 102 is from the sound source 116B. Output from the audio/video transmitter 112 passes through a transmission medium 118 to a remote audio/video receiver 120.

In another embodiment (not shown), the system 100 can comprise the microphone system 101 and controller 105 only. In this embodiment, the controller 105 can include only the signal processor 106 and spatial estimator 108. The audio compressor 111 and audio/video transmitter 112 can be external to, but in parallel with the system 100. In this embodiment, the camera motor 110 is essentially the "consumer" of the information provided by the controller 105.

There exist a number of interfaces, buses or other communication devices between the various components described herein, such as between the microphone system 101 and the controller 105, the video camera 103 and the controller 105, and so forth. Such interfaces comprise all necessary conventional electrical and mechanical components as is understood in the art, and will not be discussed in detail herein. The controller 105 may be a local or remote receiver only, or a computer, such as a lap top general purpose computer as is well-known in the art. In one embodiment, the controller 105 is a personal computer having all necessary components for processing or manipulating the input signals and generating appropriate output signals. In addition to the components listed above, the controller 105 can also include any suitable type of central processing unit, a utility, a driver, an event queue, an application, and so forth, although the invention is not so limited. In one embodiment, the components of the controller 105 are all computer programs executed by a processor of the computer, which operates under the control of computer instructions, typically stored in a computer-readable medium such as a memory. The controller 105 also desirably includes an operating system for running the computer programs, as can be appreciated by those within the art.

The microphone system 101 includes a microphone enhancer 102 and a transducer or microphone 104. In one embodiment, the microphone enhancer 102 is comprised of a microphone sleeve containing asymmetric ridges or folds which modify an acoustic signal from the sound source 116B by creating interference patterns as described herein. The modified acoustical signal is transduced by the microphone 104 into an electrical signal which is passed to the signal processor 106. In one embodiment, the signal processor 106 converts output from the microphone 104 from analog to digital form, such as a digital representation of an integer or floating point value. The digital signal is further processed by a signal processor algorithm to extract the spectral interference pattern in the signal. This information is transmitted to the spatial estimator 108 which uses established statistics to make a "best guess" as to the directionality of the sound source 116B. The directional information from the spatial estimator 108 is output to the camera motor 110. The camera motor 110 can comprise any conventional type of camera motor or tracking system which can move a camera. The camera motor 110 then moves the video camera 103 to point it in the direction of the image/sound source 116 so that the source 116 can be framed. In one embodiment, an image recognition algorithm is used to validate the output of the spatial estimator 108. An image associated with the sound source 116B is captured and processed by the audio/video transmitter 112. Simultaneously, a compressed electrical signal from the audio compressor 111 is also output to the audio/video transmitter 112. The image and compressed electrical signal are then transmitted by the audio/video transmitter 112 through the transmission medium 118, to the remote audio/video receiver 120 in a separate location. The remote audio/video receiver 120 processes and decodes the image and associated electrical signal. The resulting video output can be viewed by a third party 122 on a monitor 124 and the audio output can be listened to using one or more speakers 126.

Figure 2A:
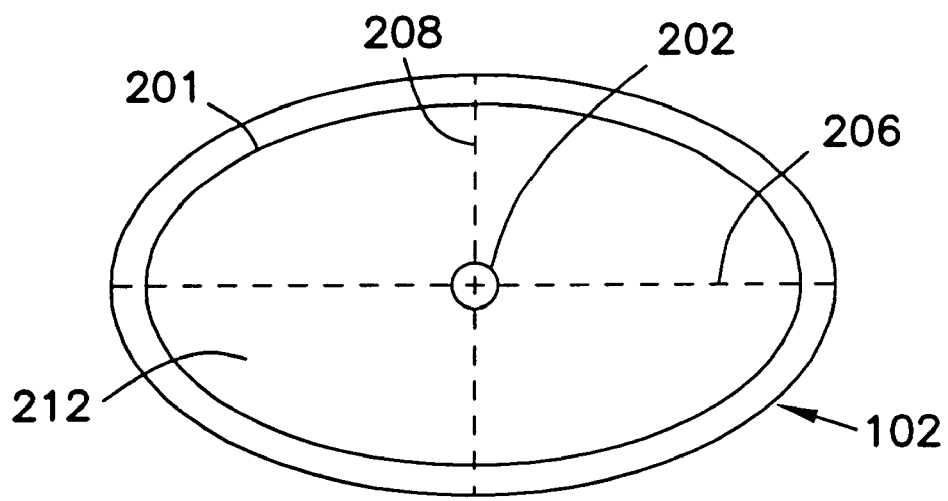
FIG. 2A is a simplified bottom view of a microphone enhancer in one embodiment of the present invention.
Figure 2B:
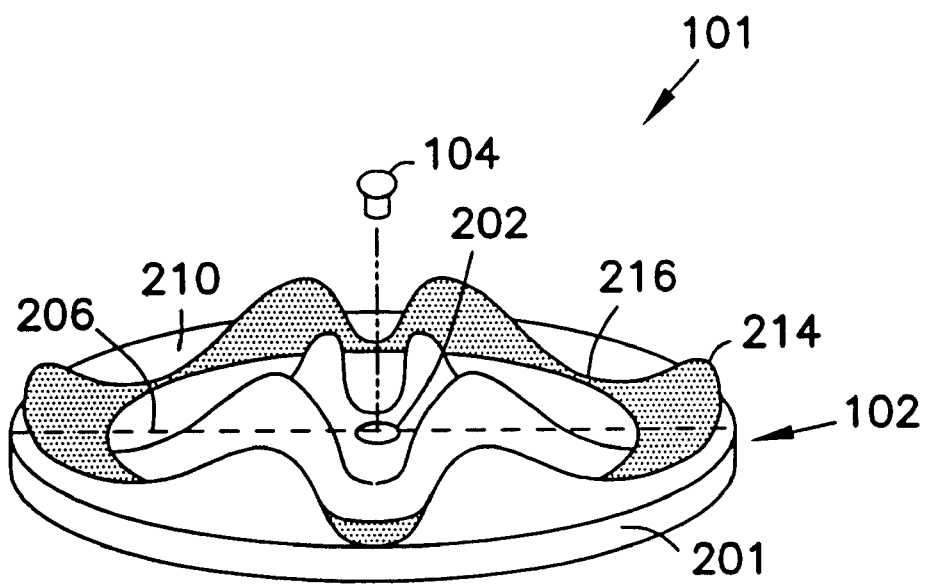
FIG. 2B is an exploded perspective view of a microphone system in one embodiment of the present invention.

The microphone enhancer 102 can be any suitable component capable of interacting with incoming acoustic signals to create frequency characteristics unique to each spatial direction and transducing these signals to the microphone 104. These interactions or interference patterns are manifested in the spectrum of each signal as spectral notches. FIG. 2A shows one embodiment wherein the microphone enhancer 102 has an elliptical or oval configuration, such that it has a major axis 206 and a minor axis 208, although the invention is not so limited. As shown in FIG. 2B, the oval configuration maximizes the difference or delay between ridges 214 located on opposite sides of the microphone hole 202, while not increasing the size of the microphone enhancer 102 in the vertical direction. With an oval configuration, the minimum dimension of the major axis 206 is defined by the resolution of the signal, which can vary depending on the application. If the major axis 206 is too small for a particular application, the ridges 214 contained in the microphone enhancer 102 can not generate detectable patterns. If the major axis 206 is too large for a particular application, there may be no difference between the reflection of the signals from the intended sound source and those of other nearby sound sources, which may cause the system to detect unwanted background noise. In one embodiment, the microphone enhancer 102 has a major axis 206 of about two (2) cm to about six (6) cm or more, and a minor axis 208 of about 0.5 cm to about three (3) cm or more.

The microphone enhancer 102 further has a front face 210 (shown in FIG. 2B), a back face 212 (shown in FIG. 2A), and can also have a rim or lip 201. The microphone enhancer 102 also has means to support or house the microphone 104. In the embodiment shown in FIGS. 2A and 2B, the microphone enhancer 102 has a microphone hole 202 in the center into which the microphone 104 can be installed. Essentially, the microphone hole 202 is a circular cutout having a flat edge. In this embodiment, the microphone enhancer 102 is bowl-shaped such that when placed with the back face 212 down towards a surface, the microphone enhancer 102 rests only on the edge of the microphone hole 202.

FIG. 2B shows one arrangement of ridges 214 and wells 216 secured to or integral with the elliptical front face 210 of the microphone enhancer 102, although the invention is not so limited. Generally, the microphone enhancer 102 contains asymmetric ridges 214 which act as reflectors for longitudinal sound waves, conceptually analogous to the pinnae of the human ear. In the case of the human ear, however, the middle and inner ear are the intended "receivers" of these vibrations. In the present invention, the microphone 104, now equipped with its own enhancer or "ear," is the intended receiver of the sound waves. In one embodiment, there are a greater number of ridges 214 and wells 216 in one hemisphere of the microphone enhancer 102. In an alternative embodiment, larger ridges 214 are located nearer to the rim 201. In another alternative embodiment, the ridges 214 are arranged similar to petals of a flower at varying stages of opening, such that they curve generally in an outwardly direction, and may or may not extend beyond the rim 201.

The ridges 214 can be any suitable height, as long as a suitable interference pattern is generated. Generally, taller ridges 214 create more powerful reflection or interference signals which are easier to detect and measure. In one embodiment the ridges 214 are of variable height, ranging from about 0.25 cm to about 0.5 cm. In an alternative embodiment, the ridges 214 are all about the same height. In another alternative embodiment, some or all of the ridges 214 are greater than about 0.5 cm in height.

In order to determine directionality of a sound source, it is necessary to have at least two raised portions in the microphone enhancer 102, i.e., either two ridges 214 or one ridge 214 having at least two peaks or humps. In one embodiment, there are two ridges 214, each located a different distance from the microphone 104. Although the microphone enhancer 102 can contain as few as two raised portions, the use of multiple raised portions or multiple ridges 214 gives greater confidence in signal directionality because multiple notches can be detected. In one embodiment, the microphone enhancer 102 has two (2) to ten (10) ridges 214 or more. In the embodiment shown in FIGS. 2B and 3, the ridges 214 are at least slightly rounded or hyperbolic.

The ridges 214 must also be a sufficient distance apart from each other to provide at least a minimum level of confidence in signal interference. Otherwise, when two sound sources are the same distance from the microphone enhancer 102, but on opposite sides of the microphone 104, a "mirroring" situation or cone of confusion may result, and the system may be unable to detect which of the two sides the sound is coming from. In one embodiment, the ridges 214 are on opposing sides of the microphone hole 202, vertically centered on the major axis 206. In another embodiment, the ridges 214 are at least about one (1) cm to about 2.5 cm or more apart from each other, depending on the size of the microphone enhancer 102.

In order to interact properly with an incoming acoustic signal (or sound wave), the microphone enhancer 102 is placed on edge, i.e., on its rim 201, in a vertical or near-vertical plane so that the top portion of the ridges 214 are perpendicular or nearly perpendicular to the incoming signal. As the microphone enhancer 102 is tilted either forwards towards the signal or backwards away from the signal, the degree of reflection, and thus the signal strength becomes increasingly reduced. If the microphone enhancer 102 is tilted too much away from normal in either direction, a shearing effect may result, such that the ridges 214 are no longer able to produce a suitable interference pattern.

The microphone enhancer 102 can also be rotated to rest on any portion of the circumference of the rim 201, depending on the particular application. In one embodiment, the major axis 206 of the microphone enhancer 102 lies in a horizontal plane, i.e., landscape position. This arrangement is useful for conventional videoconferencing applications, when it is expected that all of the participants will remain seated. In an alternative embodiment, the microphone enhancer 102 is placed with the major axis 206 in a vertical direction, i.e., portrait view. This arrangement can be used when it is expected that all of the participants will be standing, such that it is desirable to detect vertical height. In another alternative embodiment, there are at least two microphone enhancers 102 which can be arranged as a "cross," such that the major axis of a first microphone enhancer is horizontal or nearly horizontal, and the major axis of a second microphone enhancer is vertical or nearly vertical. In another embodiment, one or more circular shaped microphone enhancers 102 are used. The latter two embodiments are useful when participants are both standing and sitting.

In human hearing, the most important cues for localizing a sound source's angular position within a given horizontal plane involves the relative difference of the wavefront at the two ears. Similarly, in the present invention, the sound source's angular position is determined based on the relative difference of the wavefront at the ridges 214 on either side of the microphone 104. Specifically, interference occurs because the same signal is traveling by more than one path, but ending at the same place, i.e., the head of the microphone 104. The combination of a portion of a signal traveling a direct path with other portions of the signal traveling along at least two different delayed or reflective paths on opposite sides of the microphone, essentially forms a triangle, with the common vertices being the sound source 116B and the microphone 104. When this happens, the delayed paths' signals begin to destructively interfere with the direct path signal only at those frequencies which corresponds with the difference in distance. In this way, the corresponding spectral notches are created.

Figure 3:
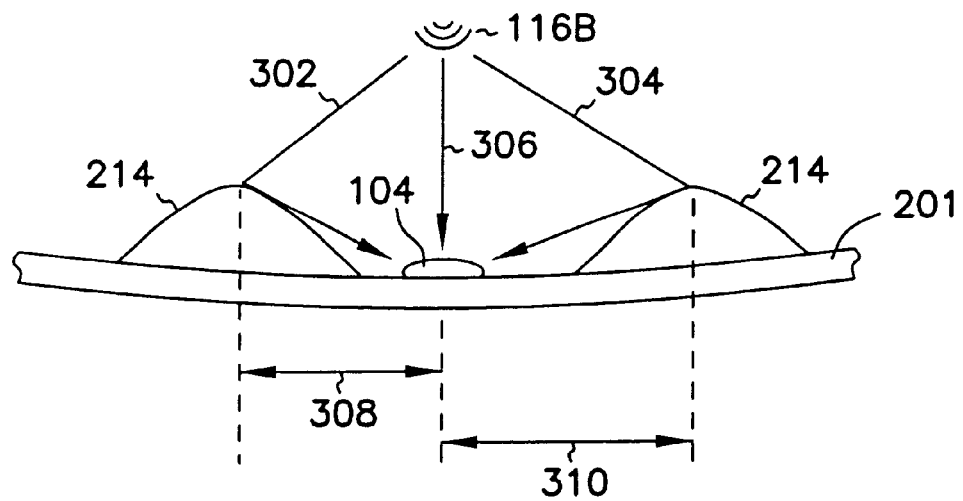
FIG. 3 is a simplified schematic illustration showing a top view of a signal from a sound source comprising three sound waves which interact with the microphone system in one embodiment of the present invention.

FIG. 3 shows an enlarged top view of a signal, comprising three different sound waves, 302, 304 and 306, encountering the microphone system 101. The figure is not drawn to scale, and each sound wave is represented by an arrow which is at or near the center of each wave. Furthermore, only two ridges 214 are shown in FIG. 3 for simplicity, although the invention is not so limited. As shown in FIG. 3, a first reflected sound wave 302 reflects off one ridge 214, a second reflected sound wave 304 reflects off another ridge 214, and a direct path sound wave 306 goes directly into the microphone 104. As a result, reception by the microphone 104 of the reflected sound waves, 302 and 304, is delayed by an amount proportional to the distance from the center of each ridge 214 to the microphone 104. In other words, the ridge-reflected sound paths, 302 and 304, are longer and cause interference. In the embodiment shown in FIG. 3, reflection of the first reflected sound wave 302 is delayed by distance 308, and reflection of the second reflected sound wave 304 is delayed by a different distance 310. The actual amount of interference or delay is variable, depending on many factors, including, but not limited to, the relative position and size of the ridges 214, microphone 104 and sound source 116B. However, this time delay is calculable using an appropriate signal processing algorithm, which varies depending on the external conditions. In one embodiment, the time delay is equivalent to about: 1 sec/330 m, since it takes a sound wave about one (1) second to travel about 330 m at standard temperature and pressure. Using the results of the algorithm, it is possible to pinpoint the direction of the sound source 116B. In one embodiment, the location of the sound source 116B is tracked to within about±five (5) degrees spatially.

As shown in FIG. 3, the microphone 104 is placed into the microphone hole 202 such that the operative end or head of the microphone 104 is surrounded by the microphone enhancer 102 on all sides. Specifically, the height of the ridges 214 are designed to be greater than the height of the microphone 104. In this way, the incoming signals from the sound source 116B are first encountered by the ridges 214 of the microphone enhancer 102, and not the microphone 104 itself. In one embodiment, the head of the microphone 104 is flush against the bottom of the microphone opening 202.

The microphone enhancer 102 can be made from any suitable material of any suitable thickness as long as it is relatively rigid and possesses some reflective properties. In one embodiment the material is highly reflective and spectrally flat such that it reflects all frequencies nearly equally, as opposed to absorbing some frequencies and reflecting others. In one particular embodiment, the material has an absorption coefficient of about 0.05 at frequencies of from about 100 Hz to about four (4) kHz, and has a spectral flatness of about±one (1) decibel (dB) from frequencies of about 100 Hz to about eight (8) kHz. The types of material the microphone enhancer 102 can be made from include, but are not limited to, plastics, ceramics, metals, various types of coated materials, and so forth. In one embodiment, the microphone enhancer 102 is made from plastic using any type of injection molding process well-known in the art and is rigid enough to retain its shape over a wide range of temperatures, e.g., from about zero (0) degrees C. to about 40 degrees C. If the material is so highly reflective as to cause reverberations, such as with certain metals, it may be necessary to further process the signal so as to remove unwanted signals or noise caused by the reverberations.

The microphone system 101 can also be placed in any suitable position in relation to the sound source 116B as long as an adequate interference pattern is generated. In one embodiment, the microphone system 101 picks up only lateralization cues, which comprise cues only in a horizontal plane. In another embodiment, the microphone system 101 picks up localization cues, which comprise both horizontal and elevational cues. When the system 100 is only attempting to detect lateralization cues, the microphone system 101 can be placed in the same or nearly the same horizontal plane as the sound source 116B. In one embodiment, adequate interference is generated when the sound source 116B is present in a horizontal arc less than about 180 degrees in relation to the front face of the microphone system 101, such as about 15 degrees or more from either side of the microphone system 101. In this embodiment, therefore, the microphone system 101 has at least a 150 degree effective range of operation in the horizontal direction. When the system 100 is also (or only) detecting elevational cues, the microphone enhancer 102 generates its own simulated head-related transfer function (HRTF), i.e., a positional transfer function (PTF), for a particular sound source 116B. In one embodiment, adequate interference is generated when the sound source 116B is present in a vertical arc less than 180 degrees in relation to the front face of the microphone system 101, such as about 15 degrees or more from either the top or bottom of the microphone system 101. In this embodiment, the microphone system 101 has at least a 150 degree effective range of operation in the vertical direction. In most videoconferencing applications, however, the sound source 116B is located at or above the horizontal plane on which the microphone system 101 is positioned.

The sound source 116B can be any suitable distance away from the microphone enhancer 102 as long as an adequate interference pattern can be generated. In one embodiment, the sound source 116B is between about one (1) m and about five (5) m away from the microphone enhancer 102. If the sound source 116B is too close to the microphone enhancer 102, the associated signal becomes so large that it is difficult to accurately distinguish direction. If the sound source 116B is too far away, it becomes difficult to differentiate the sound source 116B from ongoing background noise. In one embodiment, background noise is accommodated by programming the controller 105 with a suitable algorithm. For example, the system 100 can be operated initially with only background or environmental noise present so that a baseline can be established. Once the desired sound source 116B begins, only signals above the baseline are considered by the system 100. Any signals which are occurring at the baseline or below are effectively ignored or "subtracted," i.e., only the sound waves one sine greater in proportion to the background noise are considered.

The microphone 104 can be any suitable type of microphone which is capable of transforming sound energy into electrical energy and of producing the desired frequency response. Microphones 104 having unusual spectral characteristics, such as notches or lowpass or highpass characteristics can also be used, provided the system 100 is programmed to compensate for these characteristics. In one embodiment, the microphone 104 is a flat or nearly flat spectrum microphone. In a particular embodiment, the microphone 104 has a spectral flatness of about±two (2) dB from frequencies of about 100 Hz to about ten (10) kHz.

The microphone 104 can be any suitable size, and in one embodiment is smaller in diameter than the diameter (or major axis) of the microphone enhancer 102. In another embodiment, the microphone 104 is a small form factor microphone designed to securely fit into the microphone fitting in the microphone enhancer 102, such as the microphone hole 202. Generally, a smaller microphone 104 causes the effective size of the major axis 206 to be larger, allowing a greater delay or interference to be generated. However, if the microphone 104 is too small in relation to the microphone enhancer 102, spectral flatness may be compromised. Alternatively, if the microphone 104 is too large in relation to the microphone enhancer 102, the ability of the ridges 214 contained in the microphone enhancer 102 to generate unique interference patterns may be diminished. In one embodiment, the microphone 104 has a diameter of about 10–30% of the diameter (or major axis) of the microphone enhancer 102. In an alternative embodiment, the microphone 104 has a diameter of about 0.635 cm to about 0.95 cm. In a particular embodiment, the microphone is a Telex Claria Microphone made by Telex Communications, Inc., in Minneapolis, Minn.

Figure 4:
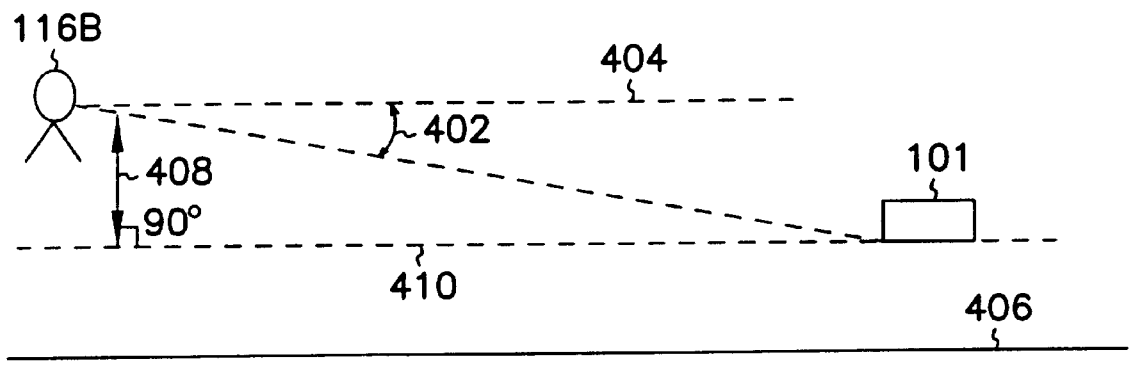
FIG. 4 is a simplified schematic diagram showing the geometry of azimuth and elevational angles with respect to a microphone system receiving an acoustic signal from a sound source in one embodiment of the present invention.

The microphone system 101 of the present invention, comprising the microphone 104 and microphone enhancer 102, is essentially substituting for a human "listener." In order for any listener to determine the direction and location of a virtual sound source, i.e., localize the sound source, it is first necessary to determine the "angular perception." The angular perception of a virtual sound source can be described in terms of azimuth and elevational angles. Therefore, the present invention determines the azimuth angle, and if applicable, the elevational angle as well, so that the microphone system 101 can localize the sound source 116B. As shown in FIG. 4, the azimuth angle 402 refers to the relative angle of the sound source 116B on a first horizontal plane 404 parallel to groundlevel 406. The elevational angle 408 refers to the angular distance of a fixed point, such as the sound source 116B, above a horizontal plane of an object, such as above a second horizontal plane 410 of the microphone system 101. Normally, azimuth is described in terms of degrees, such that a sound source 116B located at zero (0) degrees azimuth and elevation are at a point directly ahead of the listener, in this case, the microphone system 101. Azimuth can also be described as increasing counterclockwise from zero to 360 degrees along the azimuthal circle. The azimuth angle in FIG. 4 is about 30 degrees and the elevational angle 406 is about 60 degrees. The linear distance between the sound source 116B and the microphone system 101 can be referred to as a perceived distance, although it is not necessary to directly compute this distance when localizing the sound source 116B.

As noted above, interference patterns are created by the microphone enhancer 102 and then received by the microphone 104. This interference is manifested in the spectrum of the signal as a "spectral notch" (or anti-resonance), which is the opposite of a "spectral peak." Processing software is used to analyze the incoming interference patterns, i.e., estimate the spectral components of a digital signal, so that the common notches associated with a specific spatial direction can be located. A suitable algorithm is used which searches in consecutive frames of input signal spectra for consistent nulls in a specified frequency range proportionate to the ridge distances used. The azimuth angle of the sound source 116B can then be estimated based on the location of the notch in the observed signal spectra through a look-up table. By also creating interference patterns in the vertical direction, the elevation angle of the sound source 116B can also be estimated using the same detection method. This searching results in a "most likely" spatial location for that position.

Prior to entering the spatial estimator 108, however, the signal from the microphone system 101 first enters the signal processor 106 as described above. The signal processor 106 can comprise any suitable components necessary for handling the incoming signal from the microphone system 101 and providing an appropriate signal to the spatial estimator 108. As noted above and shown in FIG. 5, the signal processor 106 can include an analog-to-digital (A/D) converter 508 and a transformer 510.

Figure 5:
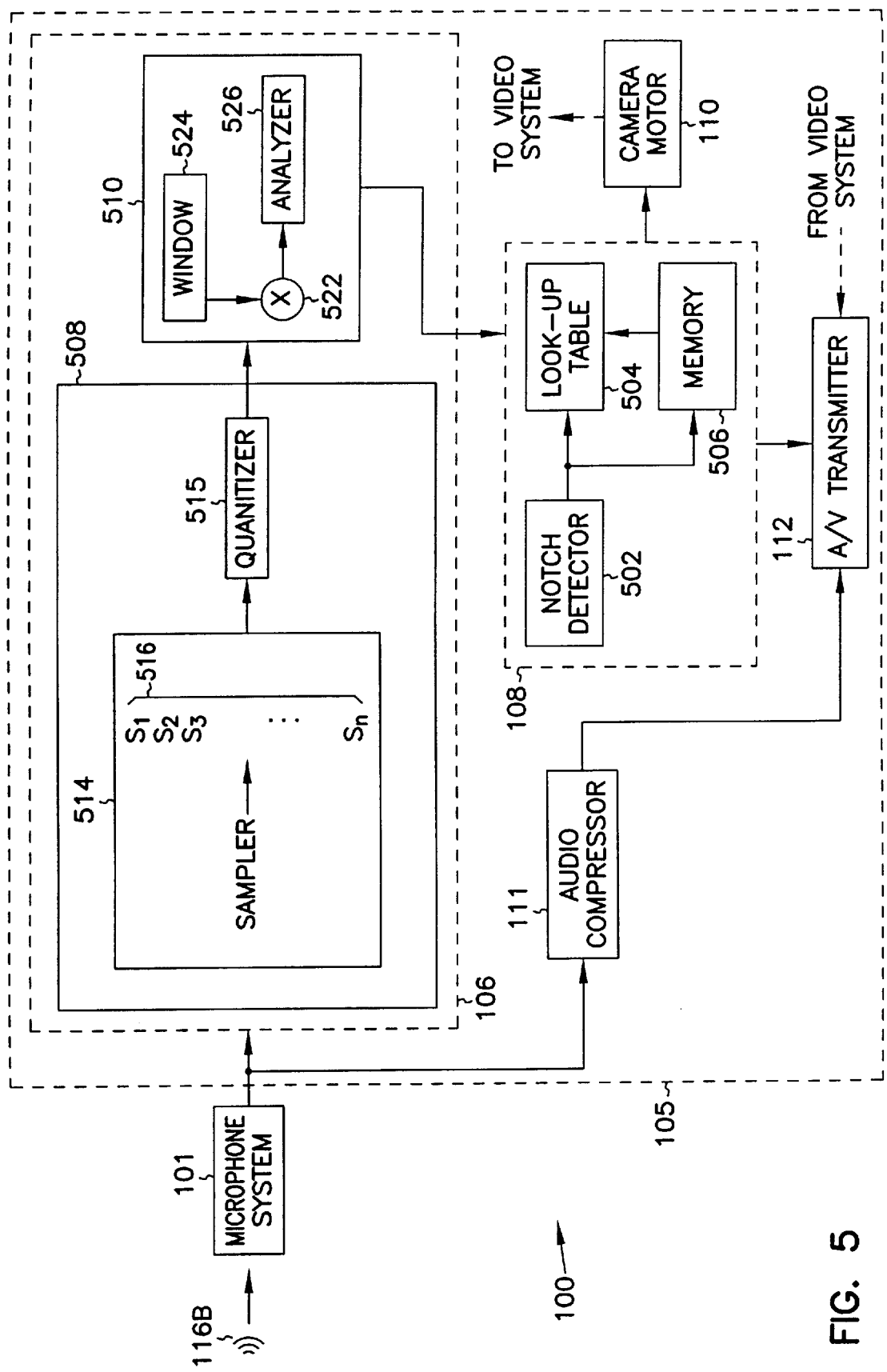
FIG. 5 is a block diagram of a controller used in the sound steering system in one embodiment of the present invention.

In the embodiment shown in FIG. 5, the A/D converter 508 includes a sampler 514, and a quantizer 515. An incoming analog signal enters the sampler 514 where sequential "samples" in time are taken. These numerical samples or frames 516 contain spectral notches, as described above. In addition to the spectral notches generated by the microphone system 101, however, the frames 516 also contain "content" spectral notches, which are present naturally in the signal from the sound source 116B. The content notches are typically transient, lasting approximately, 20 milliseconds (ms) or less and are disregarded by the system 100 as described below. The sampler 514 can operate at any suitable sampling frequency, such as about 16 kHz to about 48 kHz. In the embodiment shown in FIG., 5, the frames 516 passing through the sampler 514 are contain analog values. These frames 516 then enter the quantizer 515, where the values are adjusted or quantized into whole number increments, such that the signal is now digitized.

The frames 516 then exit the A/D converter 508, and are sent to the transformer 510. In the embodiment shown in FIG. 5, the transformer 510 includes a multiplier 522, a window 524, and an analyzer 526. In the transformer 510, the multiplier 522 multiplies the output signal from the A/D converter 508, using window functions generated by the window 524. The window 524 can generate any suitable window function known in the art, such as a conventional Hamming window, an exponential window, and so forth. The signals at the output of the multiplier 522 are further processed by the analyzer 526.

Any suitable algorithm can be used to analyze the signals, which include selecting a predetermined percentage or value for data reduction. In one embodiment, a Principal Components Analysis (PCA) or variation thereof is used, such as is described in U.S. patent application Ser. No. 08/710,270 now U.S. Pat. No. 5,928,311 to Leavy and Shen, entitled, "A Method and Apparatus for Constructing a Digital Filter." In another embodiment, the incoming digital signal is converted from a time domain to a frequency domain by performing an integral transform for each frame. Such transform can include Fourier analysis such as the inverse fast Fourier transform (IFFT) or the fast Fourier transform (FFT).

The specific calculations comprising the FFT are well-known in the art and will not be discussed in detail herein. Essentially, a Fourier transform mathematically decomposes a complex waveform into a series of sine waves whose amplitudes and phases are determinable. Each Fourier transform is considered to be looking at only one "slice" of time such that particular spectral anti-resonances or nulls are revealed. In one embodiment, the analyzer 526 takes a series of 512 or 1024 point FFTs of the incoming digital signal. In another embodiment, the analyzer 526 uses a modification of the algorithm described in U.S. patent application Ser. No. 08/772,016 to Shen, entitled, "Method and Apparatus for Performing Block Based Frequency Domain Filtering," (hereinafter "Shen"). Since Shen describes an algorithm for "generating" three-dimensional sound, the modifications would necessarily include those which would instead incorporate parameters for "detecting" three-dimensional sound.

The Fourier-transformed signals of the current frame 516 may be sent directly to other components or modules for further processing. In the embodiment shown in FIG. 5, the signals are sent directly to the spatial estimator 108. Within the spatial estimator 108, the Fourier transformed signals can be used immediately by the notch detector 502 or can first be stored for subsequent processing in a memory 506 associated with each transform. The memory 506 can store up to "N" previous frames of information. Essentially, the notch detector 502 searches in the output of the analyzer 526 for notches in specific areas which correspond to spatial direction (based on reflections from the microphone enhancer 102 described above). If a prominent notch is detected, the notch detector 502 performs statistical analysis to determine if that spatial direction was previously detected, i.e., it compares a detected notch with consecutive frames of input by using a look-up table 504 containing information on previous frames 516. In this way, more recent frames 516 are compared with older frames 516 so it can be determined with sufficient confidence that a particular notch exiting the sampler 514 is a directional spectral notch introduced by the microphone enhancer 102 (described above), and not a content spectral notch. In one embodiment, sufficient confidence is achieved when a notch appears in at least about five (5) or more sequential frames 516. In one embodiment, the notch detector 502 is comprised of a horizontal notch detector and a vertical notch detector, which search for notches in a horizontal look-up table and vertical look-up table, respectively.

If a spatial direction was previously detected, directionality signals are then sent to the camera motor 110 which, in turn, moves the video camera so that it is pointed in the direction of the detected sound source 116B. Image information is then transmitted to the audio/video transmitter 112 from the video camera. Associated audio information is also transmitted to the audio/video transmitter from the audio compressor 111.

The sound steering system 100 of the present invention can be designed to accommodate many of the variable levels which characterize a sound event. These variables include frequency (or pitch), intensity (or loudness) and duration. In an alternative embodiment, spectral content (or timbre) is also detected by the system 100.

Specifically, the system 100 can be designed to accommodate a broad range of signal frequencies, from subsonic to supersonic bandwidths, i.e., less than 15 Hz up to greater than 20 kHz. In one embodiment, the signal processing of the sound steering system 100 is designed to focus on the bandwidth associated with audible speech, i.e., from about 300 Hz to about five (5) kHz. Through the use of spectral smoothing, the signal processor 108 can also be programmed to ignore certain sounds or noise in the spectrum.

The signal processor 108 can further be programmed to ignore interruptions of a second sound source for a certain period of time, such as from one (1) to five (5) seconds or more. Such interruptions can include sounds from another person and mechanical noises, such as the hum of a motor. If the sounds from the second sound source, such as the voice of another person, continue after the predetermined period, then the camera 103 can be moved in the direction of that second sound source, if desired.

The sensitivity of the system 100 in terms of the ability to detect a certain intensity or loudness from a given sound source 116B can also be adjusted in any suitable manner depending on the particular application. In one embodiment, the system 100 can pick up intensities associated with normal conversation, such as about 75–90 dB or more. In alternative embodiments, intensities less than about 75 dB or greater than about 90 dB can be detected. However, when the signal becomes more intense, the signal strength ratio, i.e., the ratio of the direct path signal to the reflective paths' signals may not necessarily change in the same proportion. As a result, one signal may start to hide or mask the other signal such that the reflections become difficult or nearly impossible to detect, and directionality is lost.

In one embodiment, the system 100 also includes an image recognition step to confirm the presence of a sound source 116B. For example, if an error has been made in determining the direction of a sound source 116B and the camera is now pointing at an empty chair or at a person whose lips do not appear to be moving, the image recognition step can be used to verify that there is no sound source 116B in that direction, and the camera can be moved accordingly.

Depending on particular applications, reverberations may need to be accounted for in the signal processing algorithm. In one embodiment, the system is used in a conventional conference room where the participants are not speaking in unusually close proximity to a wall. In another embodiment, a large, non-carpeted room is used having noticeable reverberations.

Figure 6:
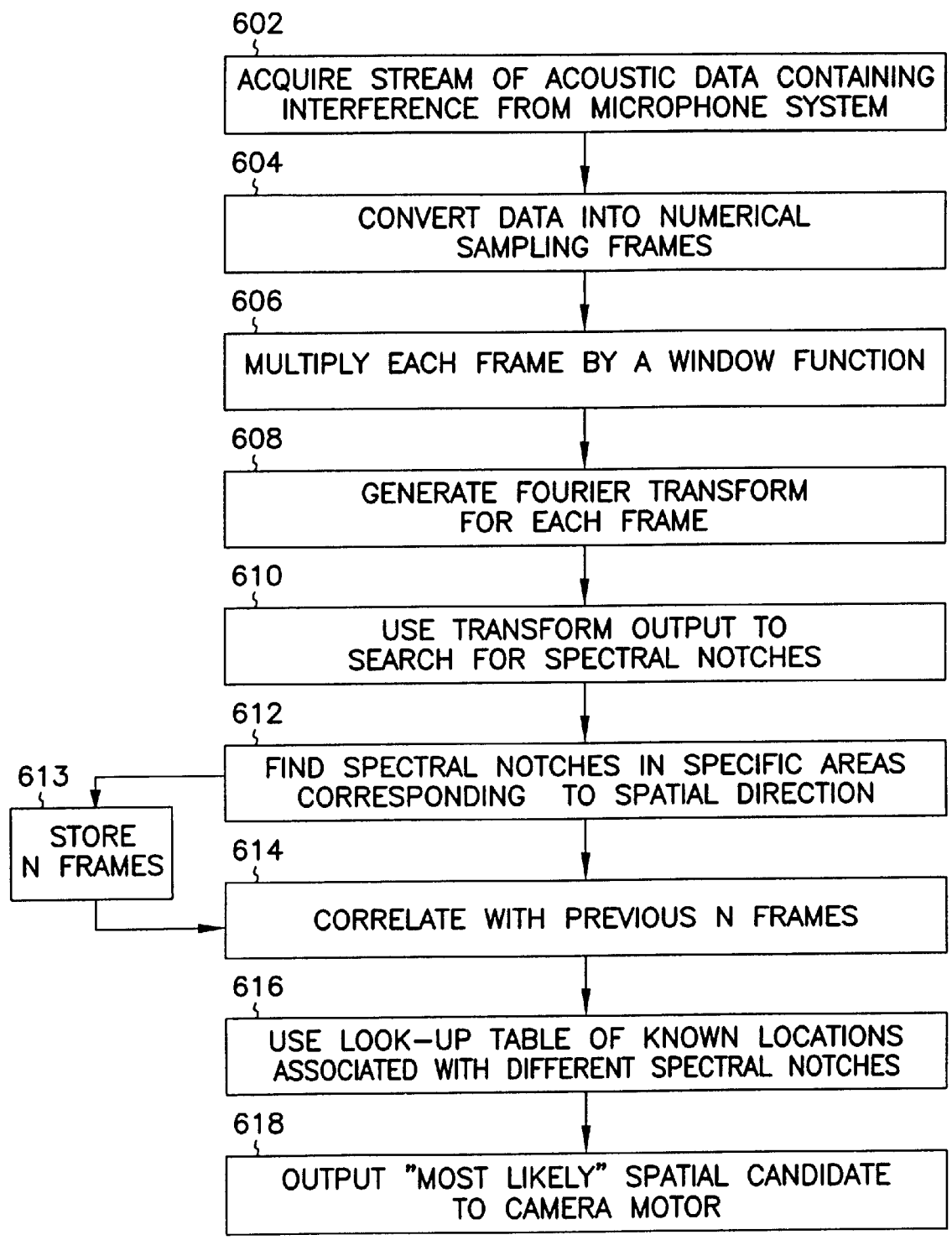
FIG. 6 is a flow chart showing steps for detecting three dimensional sound in one embodiment of the present invention.

One embodiment of the above sound detection process can be described in a series of steps as shown in FIG. 6. In the acquiring step 602, a stream of acoustic data containing interference is acquired from the microphone system. This data is converted 604 into numerical sampling frames. Each frame is then multiplied 606 by a window function. A Fourier Transform is generated 608 for each frame. The transform is used 610 to search for spectral notches. Spectral notches are found 612 within each frame in specific areas corresponding to spatial directions. The frames are stored 613 in memory, and can then be correlated 614 with the previous "N" frames. A look-up table of known locations associated with different spectral notches is used 616 to determine the correct spatial direction. Lastly, the "most likely" spatial candidate is output 618 to the camera motor.

Figure 7:
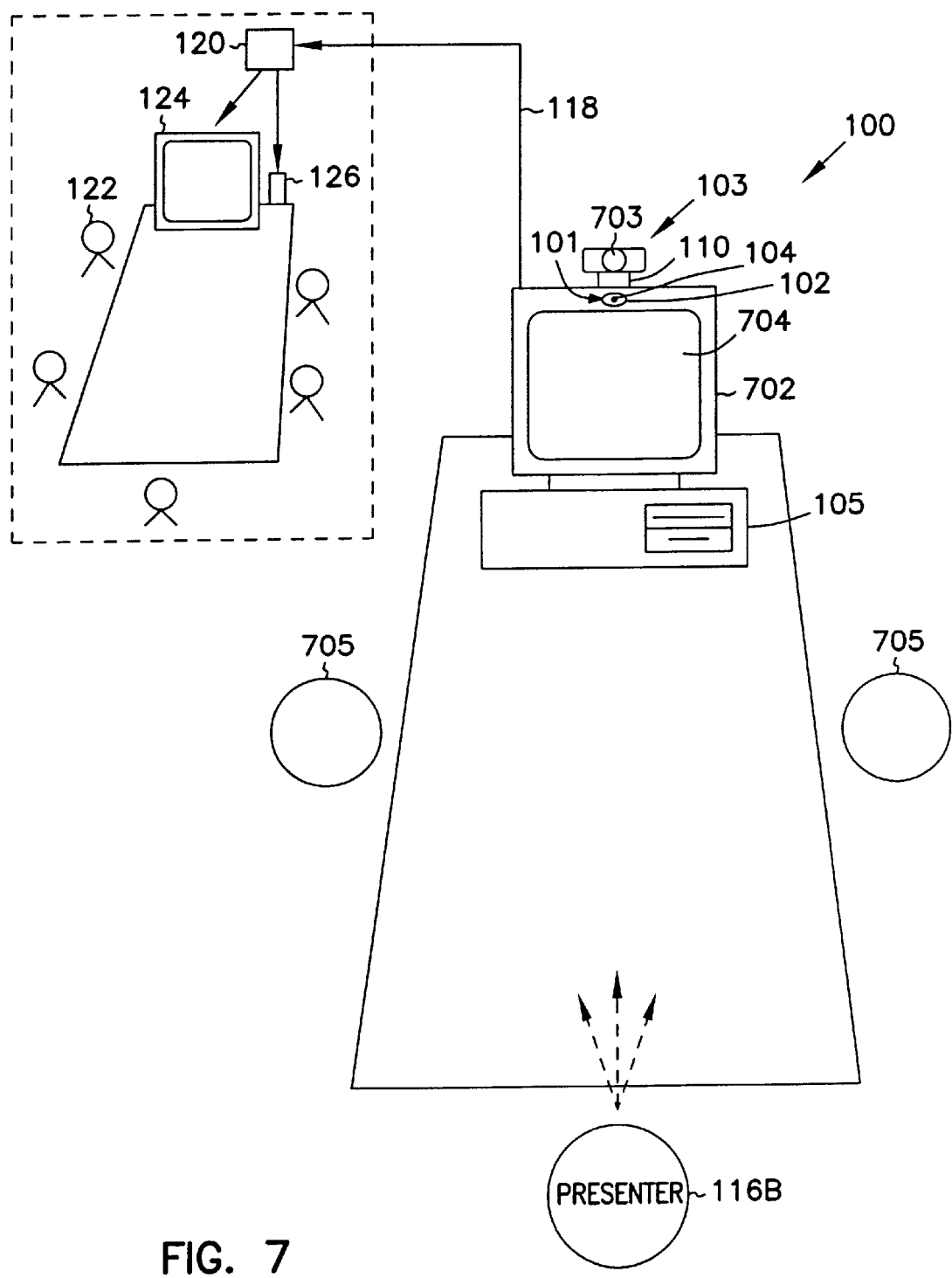
FIG. 7 is a simplified schematic illustration of a videoconferencing system in one embodiment of the present invention.

FIG. 7 shows one embodiment of an application of the present invention in use in a conventional videoconferencing arrangement. In this embodiment, the microphone system 101 is operatively connected to a video system comprising a video camera 103 having a lens 703 and a camera motor 110. Both the video system and microphone system 101 are installed on a conventional monitor 702. The microphone system 101 can be placed in any suitable location in relation to the monitor 702 and video camera 103. In one embodiment, the microphone system 101 is placed on the front face of the monitor 702 above a viewing screen 704, with the rim of the microphone enhancer 102 flush or nearly flush against the monitor 702. The microphone 104 itself is recessed into the base of the bowl-shaped microphone enhancer 102, as described above. In this embodiment, the presenter or sound source 116B is about directly in front of the system 100, while other participants 705 are seated nearby.

Any suitable type of videoconferencing system can be used. In one embodiment a video "friendly" or plug-and-play system is used. Such a system includes, but is not limited to, a Universal Serial Bus (USB) enabled computer system. Such platforms can utilize the technology of the present invention to provide more natural video phone interactions. In a particular embodiment, a Proshare 200 or Teamstation 4 system made by Intel, Inc. in Santa Clara, Calif., is used.

As shown in FIG. 7, the output from the audio/video transmitter contained within the controller 105 travels via the transmission medium 118 to the remote audio/video receiver 120. The transmission medium 118 can be any suitable type of wired or wireless medium using any suitable bandwidth over which information can be transmitted. The output through the transmission medium 118 can be sent to the remote audio/video receiver 120 using any suitable type of network operatively connected to the controller 105. The same transmission medium 118 and network can also be used to receive signals from any remote audio/video transmitter into a local audio/video receiver for complete videoconferencing capabilities. This includes, but is not limited to, a wide area network (WAN), a private branch exchange (PBX), any type of local area network (LAN) together with the appropriate bridges, routers and gateways, and so forth. In one embodiment any suitable type of Internet connection is used, such as a conventional dial-up Internet connection, or any type of high speed Internet connection such as an Integrated Services Digital Network (ISDN), and so forth. A set of Media Access Control (MAC) protocols, such as Ethernet or Token Ring, can also be used to allow information to flow smoothly over a network. In one embodiment, the transmission medium 118 comprises a two-way whole structure Ethernet connection using standard protocol, such as Transmission Control Protocol/Internet Protocol (TCP/IP). The signal from the receiver 120 is then output to any type of conventional monitor 124 and speakers 126 so that viewers 122 can see and hear the output.

Refinements to the system of the present invention can be made by testing a predetermined speaker array in an anechoic chamber to check and adjust the signal processing algorithm as necessary. Further testing can also be performed in one or more "typical" conference rooms to determine the effects of reflection, reverberation, occlusions, and so forth. Further adjustments can then be made to the algorithm, the shape of the microphone enhancer, the size and spacing of the ridges, and so forth, as needed.

The system of the present invention is more compact and requires less hardware than conventional videoconferencing systems. By detecting the source of three-dimensional sounds, rather than determining a difference between two microphone signals, it is likely the system will provide improved response time and accuracy. In one embodiment, the steering system 100 can be used to follow individual presenters or talkers by panning and tilting as needed. In another embodiment, the tracking system or sound tracker is used to point a camera at any sounds of interest, such as musical sounds. In yet another embodiment, the tracking system is used for security purposes and can detect not only the sound of a single voice, but also multiple voices, footsteps, and so forth. With appropriate modifications, the sound steering system can also be used in robotic guidance systems.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus to determine directionality of acoustic signals that arrive from an acoustic source comprising:
    a plurality of reflectors to receive and modify acoustic signals to produce modified acoustic signals, the plurality of reflectors having asymmetric ridges which modify the acoustic signals by creating interference patterns in the signals;
    a transducer located proximate to the reflectors to receive the modified acoustic signals;
    a detector operatively connected to the transducer to detect and identify spectral notches in the modified acoustic signals; and
    a device operatively connected to the detector to determine directionality of the acoustic source based upon the identified notches received.

2. An apparatus according to claim 1 wherein at least two of the plurality of reflectors are located different distances from the transducer.

3. An apparatus according to claim 2 wherein a portion of each acoustic signal encounters the asymmetric ridges prior to encountering the transducer causing a delay in time before the portion reaches the transducer.

4. An apparatus according to claim 1 wherein the plurality of reflectors are located on a finite reflecting surface having an elliptical shape, further wherein the transducer is located at the center of the ellipse.

5. An apparatus according to claim 4 wherein the reflectors are made from injection molded plastic having an absorption coefficient of at least about 0.05 at a frequency of from about 100 Hz to about four (4) kHz.

6. An apparatus according to claim 1 wherein the device for determining directionality compares the identified notches to previously detected notches to find common notches associated with a particular spatial direction.

7. An apparatus according to claim 6 further comprising a spectral smoother to eliminate unwanted noise in the acoustic signals.

8. An apparatus according to claim 7 further comprising a camera tracking system operatively connected to the apparatus wherein output from the device can activate the camera tracking system and cause a video camera to be pointed in the direction of the acoustic source.

9. A method for determining directionality of acoustic signals arriving from an acoustic source comprising:
    receiving and modifying acoustic signals using a plurality of reflectors, wherein the plurality of reflectors have asymmetric ridges which modify the acoustic signals by creating interference patterns in the signals;
    transducing the modified acoustic signals into electrical signals using a transducer located proximate to the reflectors;
    determining and identifying spectral notches in the modified acoustic signals using a detector operatively connected to the transducer; and
    using a device operatively connected to the detector, determining directionality of the acoustic source based upon the identified notches received.

10. A method according to claim 9 wherein at least two of the plurality of reflectors are located different distances from the transducer.

11. A method according to claim 10 wherein a portion of each acoustic signal encounters the asymmetric ridges prior to encountering the transducer causing a delay in time before the portion reaches the transducer.

12. A method according to claim 9 wherein the plurality of reflectors are located on a finite reflecting surface having an elliptical shape, further wherein the transducer is located at the center of the ellipse.

13. A method according to claim 12 wherein the reflectors are made from injection molded plastic having an absorption coefficient of at least about 0.05 at a frequency of from about 100 Hz to about four (4) kHz.

14. A method according to claim 9 wherein the determination of directionality includes comparing the identified notches to previously detected notches to find common notches associated with a particular spatial direction.

15. A method according to claim 14 further comprising subtracting estimates of unwanted noise from the acoustic signals using a spectral smoother.

16. A method according to claim 15 further comprising using a camera tracking system having a video camera, the camera tracking system operatively connected to the apparatus, wherein output from the spatial estimator activates the camera tracking system, causing the video camera to be pointed in the direction of the acoustic source.

17. A method for determining directionality of a sound source, comprising:
    acquiring a stream of acoustic data containing interference from the sound source;
    converting the acoustic data into numerical sampling frames;
    multiplying each frame by a window function;
    generating a Fourier transform for each frame;
    searching for spectral notches using the Fourier transform;
    finding spectral notches in specific areas corresponding to a specific spatial direction;
    looking up in a table of known locations associated with different spectral notches; and
    outputting a spatial candidate to a camera motor wherein a camera operatively connected to the camera motor is pointed in the direction of the sound source.

18. A method according to claim 17 wherein the camera records an image associated with the sound source.

19. A microphone system for use in a conference environment where a three-dimensional acoustic source emits acoustic signals from diverse and varying locations within the environment, comprising:

a microphone located at the center of at least one reflecting surface having asymmetric ridges, wherein the acoustic signals which interact with the asymmetric ridges reach the microphone later in time than the acoustic signals which travel a direct path to the microphone, further wherein all acoustic signals reaching the microphone are transduced to electrical signals; and control circuitry configured to analyze the electrical signals to determine an angular orientation of the acoustic source in relation to the microphone.

20. A system according to claim 19 wherein the control circuitry provides information on the angular orientation to a video tracking system having a camera, further wherein the video tracking system causes the camera to transmit an image associated with the acoustic source from a transmitter to a remote receiver.

21. A microphone system according to claim 20 wherein the control circuitry includes an audio compressor which provides a compressed audio signal to the transmitter.

22. A sound steering system comprising:

a microphone enhancer for determining directionality of a sound source, the microphone enhancer comprising at least two reflectors having asymmetric ridges, each reflector located on opposite sides of a microphone; and a controller coupled to the microphone to receive and transform electrical signals from the microphone into an output signal containing directional information of the sound source.

23. A system according to claim 22 further comprising a camera tracking system having a video camera, the camera tracking system operatively connected to the controller, wherein the controller output signal activates the camera tracking system, causing the video camera to be pointed in the direction of the sound source.

24. A computer readable medium having instructions for instructing a computer to perform the method of:

determining and identifying spectral notches in a stream of modified acoustic data from an acoustic source, the acoustic data modified through interaction with two or more reflectors comprised of asymmetric ridges; and determining directionality of the acoustic source based upon the identified notches received.

25. A method for instructing a computer using a computer readable medium having instructions, comprising the steps of:

determining and identifying spectral notches in a stream of modified acoustic data from an acoustic source, the acoustic data modified through interaction with two or more reflectors comprised of asymmetric ridges; and determining directionality of the acoustic source based upon the identified notches received.

26. The method as recited in claim 23 further comprising a spectral smoother to subtract estimates of unwanted noise from the acoustic source.

27. A method according to claim 24 further comprising smoothing the modified acoustic signal with a spectral smoother.

28. A method according to claim 24 wherein the acoustic source is a microphone.

29. A method according to claim 25 further comprising smoothing the modified acoustic signal with a spectral smoother.

30. A method according to claim 25 wherein the acoustic source is a microphone.

* * * * *

UNITED STATES PATENT AND TRADEMARK OFFICE
CERTIFICATE OF CORRECTION

PATENT NO. : 6,185,152 B1
DATED : February 6, 2001
INVENTOR(S) : Shen

It is certified that error appears in the above-identified patent and that said Letters Patent is hereby corrected as shown below:

Column 1,
Line 29, insert -- more -- after "two or".

Column 2,
Line 59, delete "fill" and insert -- full --, therefor.

Column 9,
Line 53, delete "are".

Signed and Sealed this

Twenty-first Day of August, 2001

*Attest:*

*Attesting Officer*

NICHOLAS P. GODICI
*Acting Director of the United States Patent and Trademark Office*